(12) United States Patent
Su

(10) Patent No.: US 7,258,748 B1
(45) Date of Patent: Aug. 21, 2007

(54) METHOD AND SOLUTION FOR BAKERY PAN DEGLAZING AND DECARBONIZING

(75) Inventor: Mingzhong Su, Kennesaw, GA (US)

(73) Assignee: Chemstar Corporation, Lithia Springs, GA (US)

( * ) Notice: Subject to any disclaimer, the term of this patent is extended or adjusted under 35 U.S.C. 154(b) by 0 days.

(21) Appl. No.: 11/539,196

(22) Filed: Oct. 6, 2006

(51) Int. Cl.
*B08B 7/04* (2006.01)

(52) U.S. Cl. ............... 134/19; 134/25.2; 134/25.3; 134/34; 134/35; 134/36; 134/42; 510/197; 510/201; 510/218; 510/421; 510/435; 510/500

(58) Field of Classification Search ............ 134/19, 134/25.2, 25.3, 34, 35, 36, 42; 510/197, 510/201, 218, 421, 435, 500
See application file for complete search history.

(56) References Cited

U.S. PATENT DOCUMENTS

| 6,506,261 B1* | 1/2003 | Man ................ 134/39 |
| 6,852,349 B2 | 2/2005 | Smith et al. |
| 2002/0082185 A1* | 6/2002 | Totoki ............. 510/405 |
| 2003/0045437 A1* | 3/2003 | Ward .............. 510/218 |
| 2006/0133506 A1* | 6/2006 | Dang ............ 375/240.17 |

* cited by examiner

*Primary Examiner*—Sharidan Carrillo
(74) *Attorney, Agent, or Firm*—Bryan W. Bockhop; Bockhop & Associates, LLC

(57) ABSTRACT

In a method for processing a baking pan, the baking pan is placed in a solution including: water, N-Methyl-2-Pyrrolidone, Ethoxylate of nonylphenol, Monoethanolamine, Triethanolamine and Potassium hydroxide. The solution is heated to a temperature in a predefined temperature range. The baking pan is removed from the solution after a predefined period of time.

11 Claims, 1 Drawing Sheet

METHOD AND SOLUTION FOR BAKERY PAN DEGLAZING AND DECARBONIZING

BACKGROUND OF THE INVENTION

1. Field of the Invention

The present invention relates to deglazing and decarbonizing bakery pans and, more specifically, to a method and solution for deglazing and decarbonizing bakery pans at low temperatures using a water-based solution.

2. Description of the Prior Art

A large-scale bakery typically bakes thousands of loaves of bread each day. Each loaf is typically baked in a baking pan that gives the loaf its shape. A baking pan is typically coated with a pan release coating, such as a silicone polymer, prior to the dough that becomes a loaf of bread being put in the baking pan. The baking pan and the dough are then put into an oven, which bakes the loaf for a predetermined amount of time at a predetermined temperature. After baking, the loaf is removed from the baking pan. Once the loaf is removed, the baking pan is cleaned and then reused. Some baking pans may be used to bake several different loaves per day.

After the baking pans have been through a number of baking cycles the release coating will diminish in effectiveness and the baking pans will be cycled through a reglazing process. The reglazing process entails the removal of the worn release coating and any carbonized soils on the baking pan and the application of a new glaze coating. In some cases a decarbonizing step is under taken prior to the removal of the worn glaze in an overnight dissolution process.

The current state of the art for accomplishing the removal of the worn glaze is to submerge a number of pans in an organic solution, which may include diethylene glycol and hexylene glycol supplemented with a small amount of potassium hydroxide, which is heated to about 200° F. for a period of from 1 to 2 hours. A separate decarbonizing step is used if the baking pans have a substantial carbon build-up. The baking pans are then removed, rinsed and washed in a spray cabinet, dried and recoated with a solvent based solution of the silicone polymer.

The high temperature associated with deglazing and decarbonizing results in high energy costs for a large-scale commercial bakery. Also, the use of organic solvents requires special handling and disposal.

Therefore, there is a need for a deglazing and decarbonizing system for bakery pans that deglazes and decarbonizes in a single step.

There is also a need for a deglazing and decarbonizing system for bakery pans that employs an aqueous solvent.

There is also a need for a deglazing and decarbonizing system for bakery pans that deglazes and decarbonizes at a relatively low temperature.

SUMMARY OF THE INVENTION

The disadvantages of the prior art are overcome by the present invention which, in one aspect, is a method for processing a baking pan, in which the baking pan is placed in a solution including: water, N-Methyl-2-Pyrrolidone, Ethoxylate of nonylphenol, Monoethanolamine, Triethanolamine and Potassium hydroxide. The solution is heated to a temperature in a predefined temperature range. The baking pan is removed from the solution after a predefined period of time.

In another aspect, the invention is a method for processing a baking pan, in which the baking pan is placed in an aqueous deglazing and decarbonizing solution. The solution is heated to a temperature between 120° F. and 150° F. The baking pan is removed from the solution after a predefined period of time.

In yet another aspect, the invention is a solution for processing a baking pan that includes water, N-Methyl-2-Pyrrolidone, Ethoxylate of nonylphenol, Monoethanolamine, Triethanolamine, and Potassium hydroxide.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
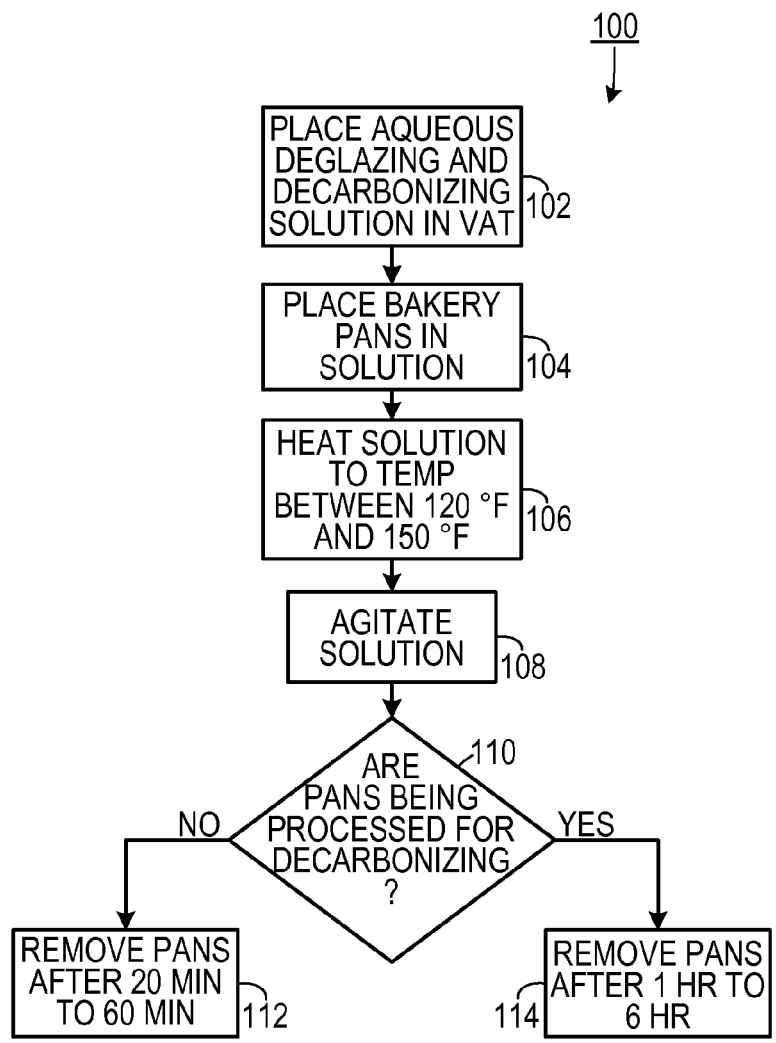
FIG. 1 is a flow chart demonstrating one method for deglazing and decarbonizing bakery pans.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

In one embodiment, bakery pans may be deglazed and decarbonized using an aqueous solution that includes the following ingredients:

| Ingredient | Percent (by weight) |
| --- | --- |
| water | 33.7 |
| NMP (N-Methyl-2-Pyrrolidone) | 40.4 |
| NP9 (Ethoxylate of nonylphenol) | 4.0 |
| MEA (Monoethanolamine) | 10.1 |
| TEA (Triethanolamine) | 10.1 |
| KOH (40% Potassium hydroxide) | 1.7 |

As would be readily recognized by those of skill in the deglazing art, other relative concentrations of the above-listed ingredients may be employed without departing from the scope of the invention. Also, as used herein, "40% Potassium hydroxide" refers to a solution of 40% Potassium hydroxide and 60% water. Thus the 1.7% in the solution is the combination of 40% KOH and 60% water. It should be understood that dry KOH (100% KOH) could be used. The predissolved KOH solution makes mixing of the aqueous deglazing solution easier.

In this solution, water is used as a carrier, NMP works as a solvent to attack the silicone coating of the glaze on the pans, NP9 helps to penetrate into the silicone film and provides a detergent action, MEA and TEA work as solvents and provide alkalinity and some viscosity, and KOH works as alkaline builder and helps to dissolve the silicone film.

As shown in FIG. 1, one illustrative method for using the above-listed solution includes placing 102 the aqueous deglazing and decarbonizing solution in a vat and placing 104 the bakery pans in the solution. The solution is heated to a temperature of between 120° F. and 150° F. 106. (It should be noted that the aqueous solution could be preheated to the working temperature before the bakery pans are placed in the vat.) The solution may be agitated 108 to maintain a uniform temperature throughout the solution. (However, the solution can be effective without agitating.) The amount of time that the bakery pans remain in the solution depends on whether they are being processed only for deglazing or for both deglazing and decarbonization 110. If they are only being deglazed, then they may be removed after 20 minutes to 60 minutes 112 (depending on the amount of worn glaze to be removed). If they are being both decarbonized and deglazed, then they may be removed after one hour to six hours 114 (depending on the amount of carbon to be removed).

Figure 2:
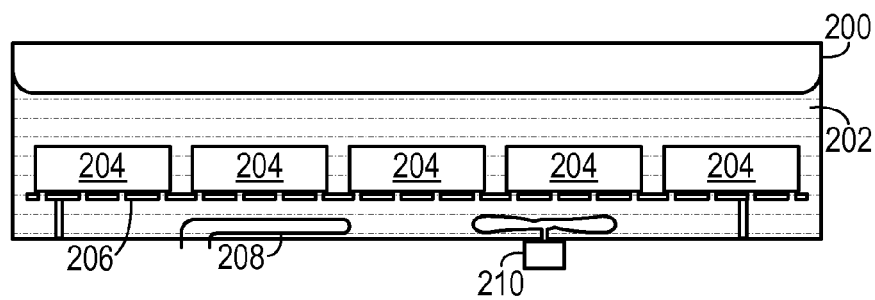
FIG. 2 is a cross-sectional view of a vat including a plurality of bakery pans and a deglazing and decarbonizing solution.

As shown in FIG. 2, the solution 202 and a plurality of baking pans 204 are placed in a vat 200. The pans 204 may be placed on a wire rack 206. The solution 202 is heated with a heating element 208 and agitated with a mixer 210.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for processing a baking pan, comprising the steps of:
    a. placing the baking pan in a solution that includes the following concentrations of ingredients by weight: water 33.7%, n-methyl-2-pyrrolidone 40.4%, ethoxylate of nonylphenol 4%, monoethanolamine 10.1%, triethanolamine 10.1%, and 1.7% of a 40% by weight of an aqueous solution of potassium hydroxide;
    b. heating the solution to a temperature in a predefined temperature range; and
    c. removing the baking pan from the solution after a predefined period of time.

2. The method of claim 1, further comprising the step of agitating the solution to increase temperature uniformity of the solution.

3. The method of claim 1, wherein the predefined temperature range comprises a temperature of between 120° F. and 150° F.

4. The method of claim 1, wherein the predefined period of time comprises a period that will result in the baking pan becoming substantially deglazed.

5. The method of claim 1, wherein the predefined period of time comprises a period that will result in the baking pan becoming substantially deglazed and in which substantially all carbon buildup is removed from the baking pan.

6. The method of claim 4, wherein the predefined period of time is in a range of between 20 minutes and 60 minutes.

7. The method of claim 5, wherein the predefined period of time is in a range of between one hour and six hours.

8. A method for processing a baking pan, comprising the steps of:
    a. placing the baking pan in an aqueous deglazing and decarbonizing solution that includes the following concentrations of ingredients by weight: water 33.7%, n-methyl-2-pyrrolidone 40.4%, ethoxylate of nonylphenol 4%, monoethanolamine 10.1%, triethanolamine 10.1%, and 1.7% of a 40% by weight of an aqueous solution of potassium hydroxide;
    b. heating the solution to a temperature between 120° F. and 150° F.; and
    c. removing the baking pan from the solution after a predefined period of time.

9. The method of claim 8, further comprising the step of agitating the solution to increase temperature uniformity of the solution.

10. The method of claim 8, wherein the predefined period of time comprises a period between 20 minutes and 60 minutes so that the baking pan will become substantially deglazed.

11. The method of claim 8, wherein the predefined period of time is in a range of between one hour and six hours so that the baking pan will become substantially deglazed and so that substantially all carbon buildup is removed from the baking pan in a single step.

* * * * *